United States Patent [19]

MacGregor

[11] Patent Number: 5,148,877
[45] Date of Patent: Sep. 22, 1992

[54] APPARATUS FOR LATERAL DRAIN HOLE DRILLING IN OIL AND GAS WELLS

[76] Inventor: Donald C. MacGregor, 13 Hunters Trail, Warren, N.J. 07060

[21] Appl. No.: 520,718

[22] Filed: May 9, 1990

[51] Int. Cl.[5] .................. E21B 7/08; E21B 17/20; E21B 17/22
[52] U.S. Cl. .................. 175/79; 175/62; 175/320; 175/323
[58] Field of Search .......... 175/79, 82, 77, 78, 175/81, 61, 62, 320, 323, 122, 162, 202, 203

[56] References Cited

U.S. PATENT DOCUMENTS

| | | | |
|---|---|---|---|
| 1,424,109 | 7/1922 | McBride | 175/79 |
| 2,258,001 | 10/1941 | Chamberlain | 175/79 X |
| 2,571,644 | 10/1954 | Zublin | 175/79 |
| 2,797,893 | 7/1957 | McCune et al. | 175/79 X |
| 3,528,515 | 9/1970 | Garrison | 175/78 |
| 3,838,736 | 10/1974 | Driver | 175/61 X |
| 4,333,539 | 6/1982 | Lyons et al. | 175/61 |
| 4,397,360 | 8/1983 | Schmidt | 175/61 |
| 4,420,049 | 12/1983 | Holbert | 175/45 |
| 4,421,183 | 12/1983 | Collins, Jr. | 174/114 |
| 4,436,165 | 3/1984 | Emery | 175/61 |
| 4,442,908 | 4/1984 | Steenbock | 175/74 |
| 4,460,202 | 7/1984 | Chance et al. | 175/323 X |
| 4,600,037 | 7/1986 | Hatten | 138/120 |
| 4,601,353 | 7/1986 | Schuh et al. | 175/41 |
| 4,640,362 | 2/1987 | Schellstede | 175/79 X |
| 4,658,916 | 4/1987 | Bond | 175/81 |
| 4,667,751 | 5/1987 | Geczy et al. | 175/61 |
| 4,699,224 | 10/1987 | Burton | 175/61 |
| 4,880,067 | 11/1989 | Jelsma | 175/61 X |
| 4,964,474 | 10/1990 | Poesch | 175/61 |

FOREIGN PATENT DOCUMENTS 541972 9/1974 U.S.S.R. .................. 175/79

Primary Examiner—Stephen J. Novosad

[57] ABSTRACT

Apparatus for drilling horizontal drain holes from within existing wellbores is comprised of a flexible rotary drillstring made from a plurality of arcuate elements tightly drawn along a central cable, and of driving and redirecting apparatus to rotate and deflect the drillstring. The elements, engaged to the cable, provide a stiff drillstring which, combined with the rotary drive at the well bottom, permits extensive drilling. A deflection block, precisely fitted to the drillstring and to other apparatus requirements, enables the drilling functions. An alternate drillstring has cylindrical interlocking elements with internal alignment means.

18 Claims, 12 Drawing Sheets

FIG. 13  ARTICULATION 2° 24' PER SEGMENT

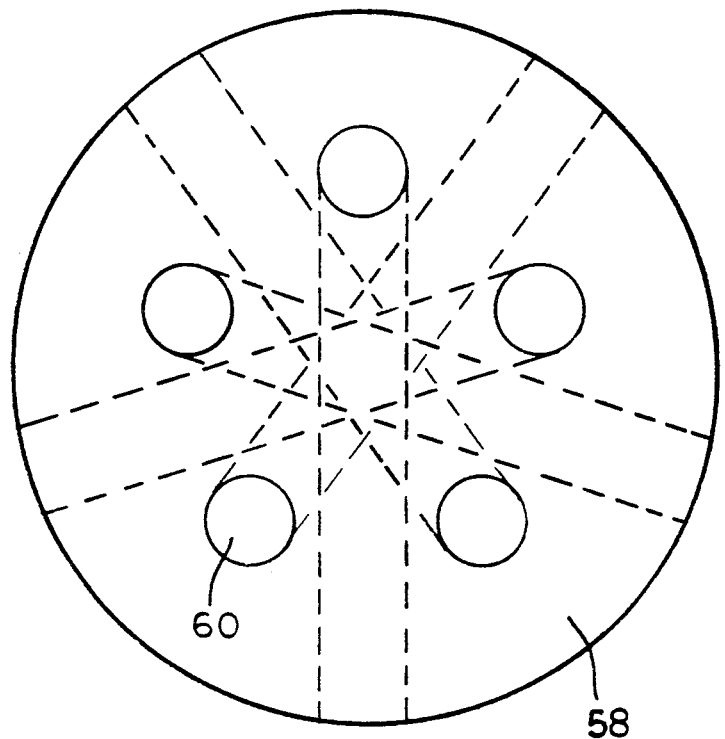
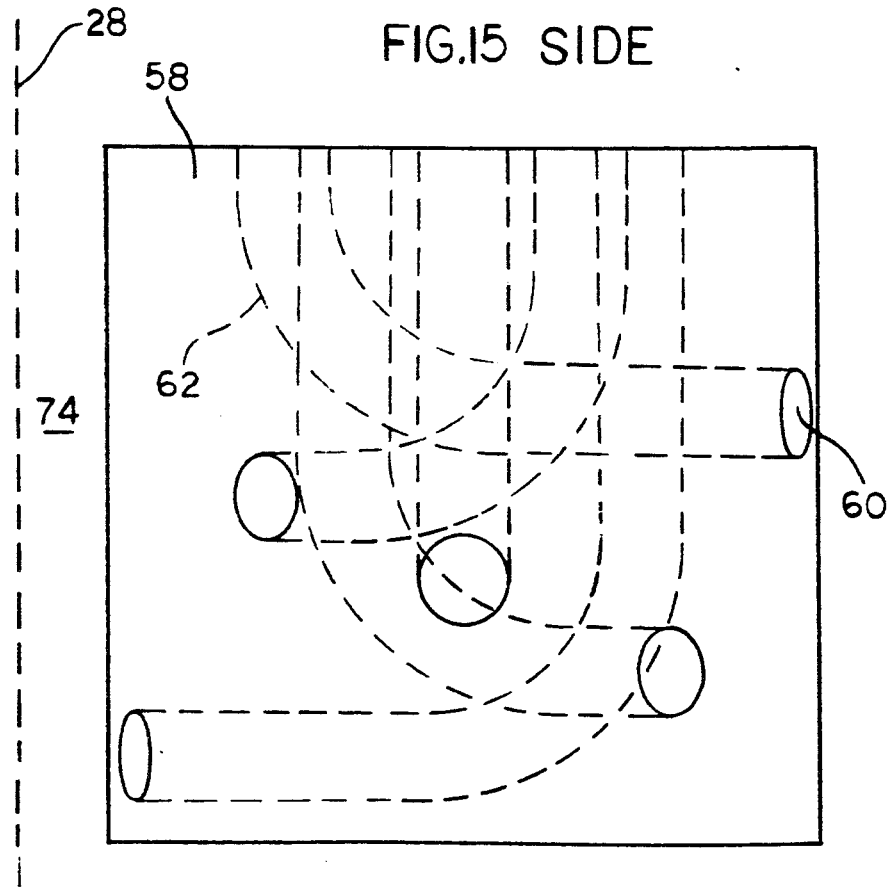
FIG.15 TOP
FIG.15 SIDE

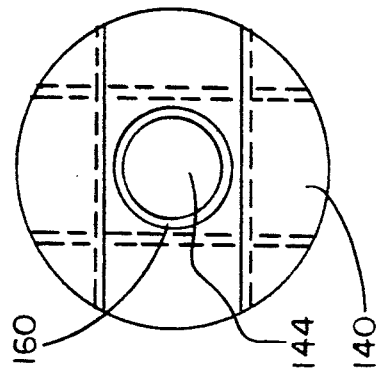
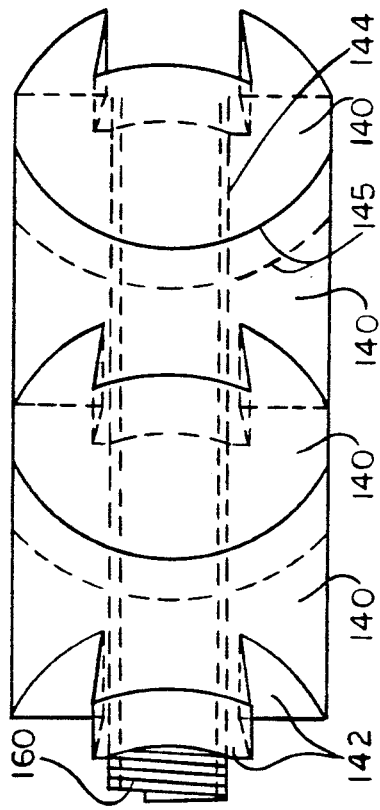
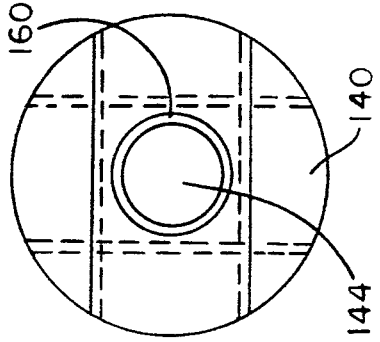
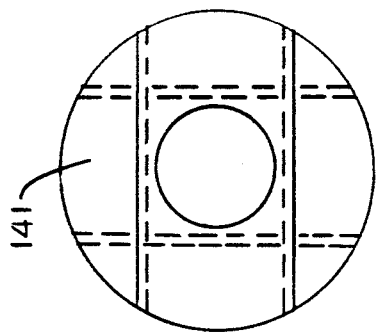
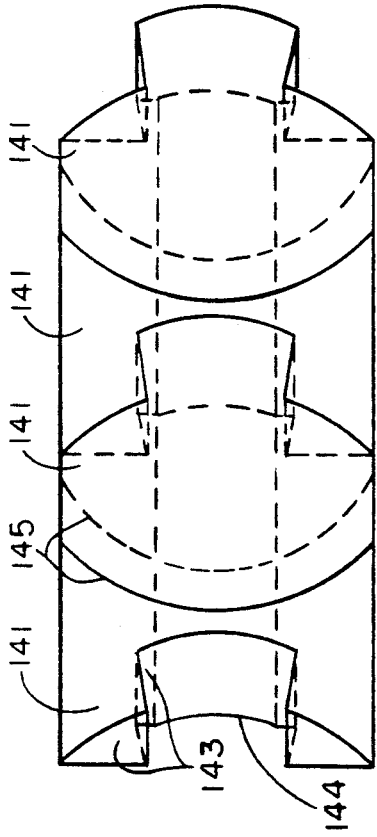
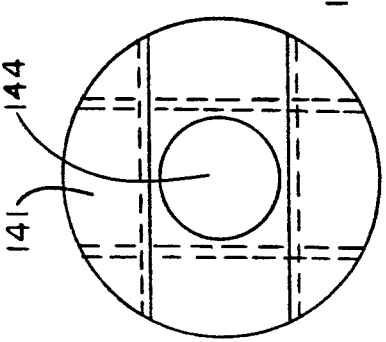

APPARATUS FOR LATERAL DRAIN HOLE DRILLING IN OIL AND GAS WELLS

BACKGROUND OF THE INVENTION

The present invention relates to methods and apparatus for lateral drilling. More specifically, but not by way of limitation, this invention relates to drilling substantially horizontal drain holes from substantially vertical oil and gas wells, coal degasification wells, geothermal wells, solution mining wells and the like.

Well known in oil fields are low production wells in deposits such as tight sandstones where the flow and collection of oil is greatly restricted by a combination of low oil flow within the sands and a limited area of exposure of the well to the producing zone as limited by the diameter of the wellbore and the depth of the producing zone.

Adding to the flow problem are oils of high viscosity which move slowly in most sands, shales, chalks, limestones, evaporites and the like.

Although many other methods for drilling lateral boreholes have been proposed and successfully demonstrated, this invention differs in scope and requirement, sine qua non.

The present invention provides simple and effective means to readily develop within existing wellbores, especially in marginal and shallow-well fields, a multiplicity of small diameter drain holes at any depth and direction within the pay zone, at any deviated angle up to the horizontal and beyond, and in many ground conditions for up to a few hundred feet each, although in some cases it may be for a few thousand feet.

This invention is viewed as being an improvement over prior art methods and apparatus for many of the conditions encountered in oil and gas fields. It is in this spirit that the present invention will find its useful place amongst the abundance of known methods and apparatus.

SUMMARY OF THE INVENTION

It is an object of this invention to provide methods and apparatus for drilling lateral drain holes from within existing oil and gas wellbores directly into the hydrocarbon bearing zones, with the turned radius from the vertical to the horizontal being less than the wellbore diameter, and for many situations with the turned radius being less than the wellbore radius, such that horizontal drilling will immediately proceed into the wellbore side at a prescribed angle and direction, and at a precise elevation.

The first condition permits a larger drillstring diameter for longer drilling distances.

The second condition permits simplified equipment which operates along the wellbore centerline.

Either condition permits multiple simultaneous drilling operations, each at individual angle, direction and elevation headings.

Accordingly, an object of the present invention is to provide improved methods and apparatus to drill lateral drain holes from existing wellbores with little, if any, well modification, and from wellbore locations within the producing zones, and with a readily installed and operated drilling system that can be easily removed for re-use.

Thus having greatly improved the drainage of oil bearing areas adjacent to and between vertical wellbores, in addition to increasing production, the present invention will reduce the requirement for additional wells.

The present invention will especially improve production in large horizontal oil fields of shallow depth with a multiplicity of closely spaced wells, including marginal wells and wells no longer productive.

The development of this technology will certainly lead to its use in a variety of situations well beyond this scope.

Other aspects, objects and advantages of this invention will become apparent to those skilled in the art, from this disclosure, the appended drawings, the elements description and from the claims.

BRIEF DESCRIPTION OF THE DRAWINGS

FIG. 15 is a deflection block with five passageways.

FIG. 17 is a series of interlocking flexible drillstring segments.

FIG. 18 is a series of interlocking flexible drillstring segments.

DESCRIPTION OF THE DRAWINGS

Figure 1:
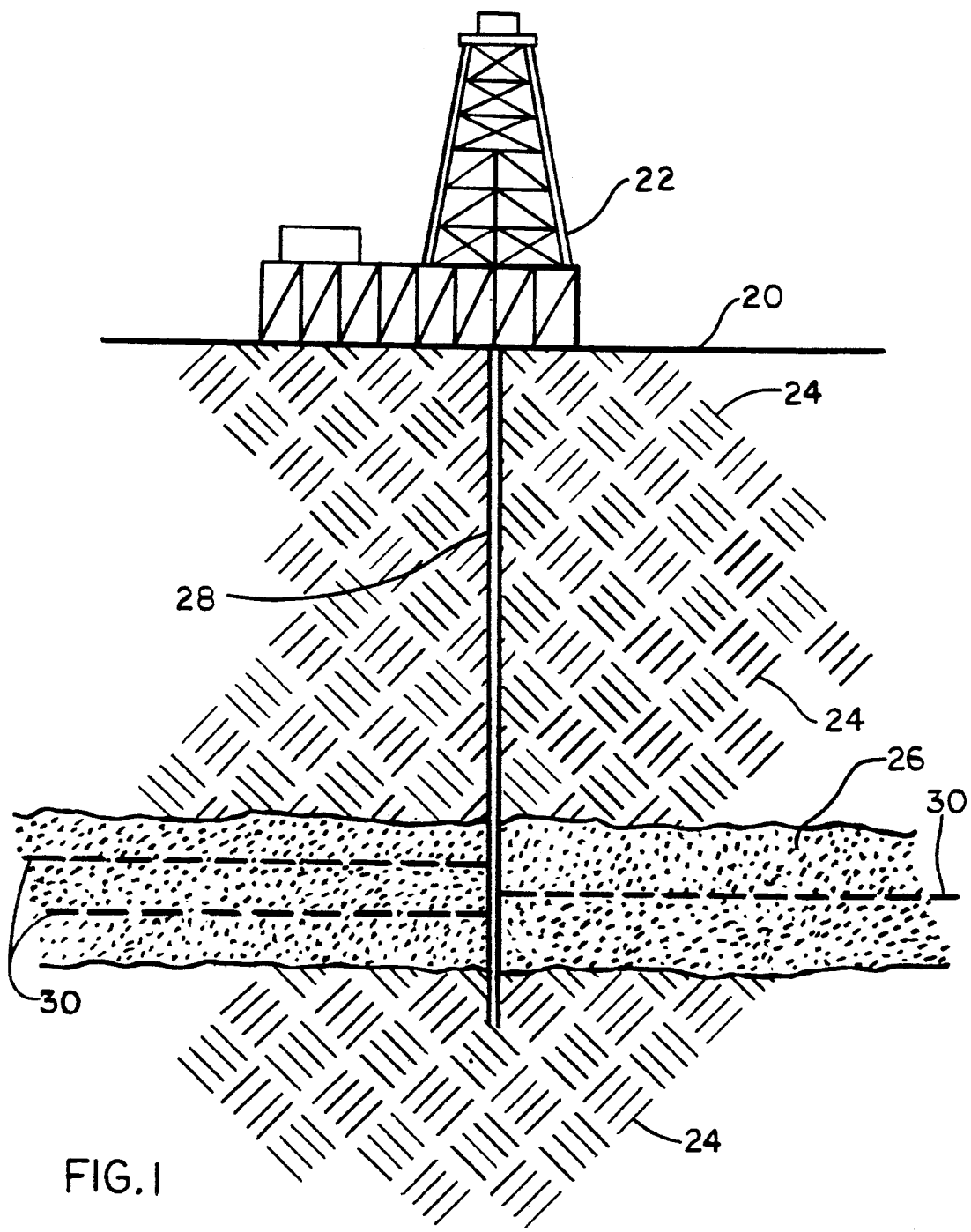
FIG. 1 is a section of a primary wellbore including drillbore drain holes within the earth in accordance with the present invention.

FIG. 1 A rotary drilling rig 22 at the earth's surface 20 drills lateral drain holes 30 directly into a hydrocarbon bearing formation 26 from a primary wellbore 28, which passes through earth formations 24.

Figure 2:
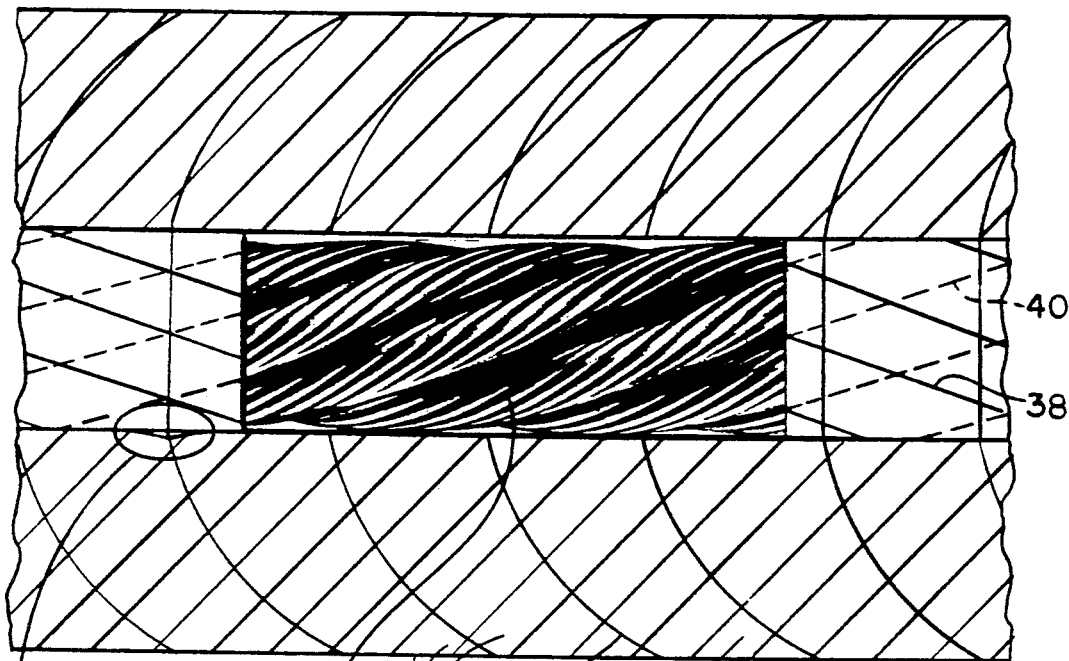
FIG. 2 is a section of a portion of a flexible drillstring.

FIG. 2 A sectioned flexible drillstring 64, except for a helical cable e.g. wire rope 36 of which a piece is in place, has a plurality of disks 32, with spherical surfaces 34 and cylindrical edges 42, which are closely fitted to cable 36 by a helical surface grooved center hole 38. Also shown are the forward surface grooves 40 which have been removed with the section.

Figure 2A:
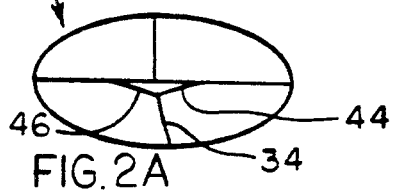

FIG. 2A An enlargement of the area of the spherical surface 34 interface with the center hole 38 shows the relief at the front edge 46 and the rear edge 44 of the disk, as required to facilitate and control flexing.

Figure 3:
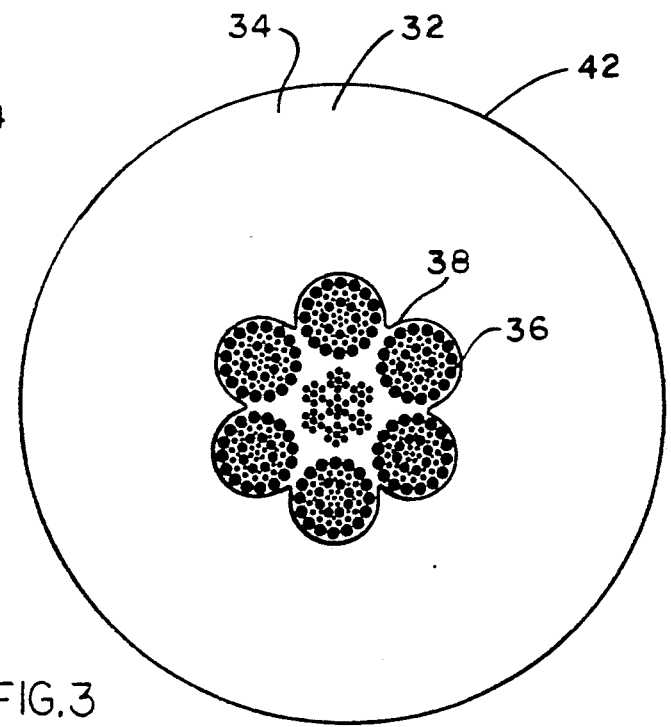
FIG. 3 is a cross-section of FIG. 2.

FIG. 3 A washer, or disk, contains a cross-section of a wire rope 36 within its helically grooved center hole 38. The washer 32 has a cylindrical edge 42, and spherical surface 34 on both sides.

Figure 4:
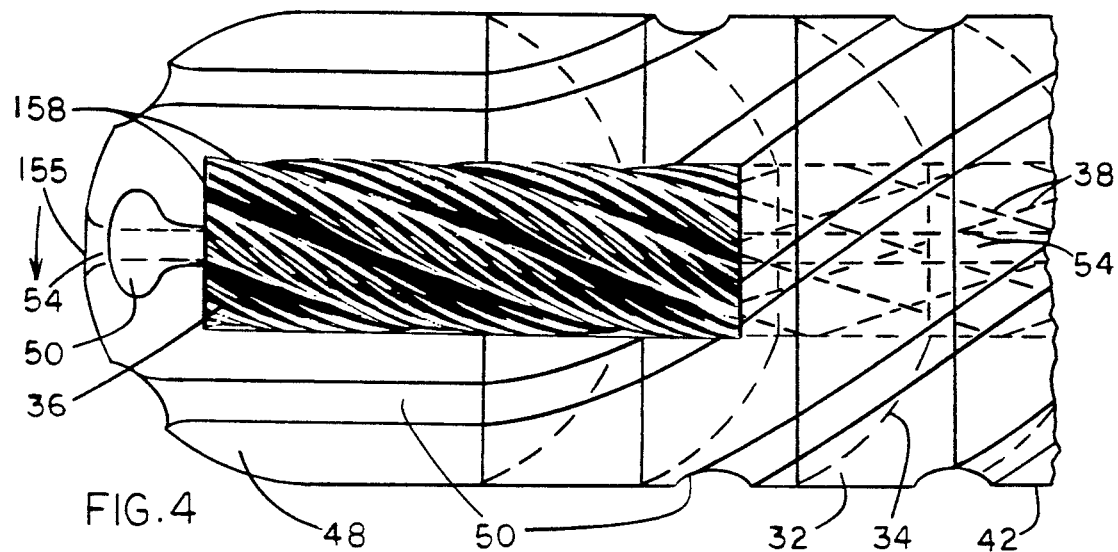
FIG. 4 is the drill bit end of a flexible drillstring.

FIG. 4 The drill tool bit end of the flexible drillstring section includes the bit 48, a helically wound cable, e.g. wire rope, 36, herein shown with an open section over a short length of the wire rope, herein shown in Lang lay for maximum flexile and torsional characteristics, a disk 32 with spherical surfaces 34, the disk edge 42, the disk center hole helical flutes 38, the center passageway outlet from the tool bit 155, the center passageway 54, the surface of the attachment of the tool bit to the cable 158, herein formed to the cable as by powdered metal, or other fusion or welding type means, or attached by available permanent or removable means; and, with external helical passageways, or grooves, 50 which are in the direction counter to the helix of the wire rope permitting the grooves to have a rotational augering action, the slope of the grooves such that they align and connect to mating grooves from disk to disk such that the disks are either all identical, or similar but with the groove path being determined by specific placement of the disks in sets of two or more disks.

Figure 5:
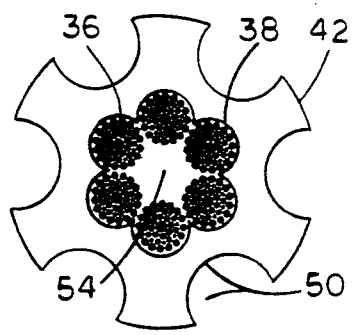
FIGS. 5 through 10 are cross-sections of various flexible drillstring forms.

FIG. 5 A drillstring cross-section featuring a 6×41 Warrington-Seale Type M wire rope 36 with no core allowing center passageway 54, with the rope within the disk center hole 38, cylinderical disk edge 42 containing external passageway 50.

Figure 6:
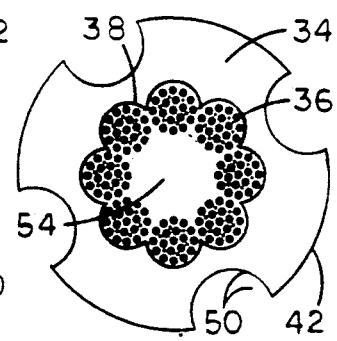

FIG. 6 A drillstring cross-section featuring an 8×25 filler wire Type W with a center passageway 54 instead of a core, wire rope within the disk center hole 38, including also edge 42, groove 50, and spherical surface 34.

Figure 7:
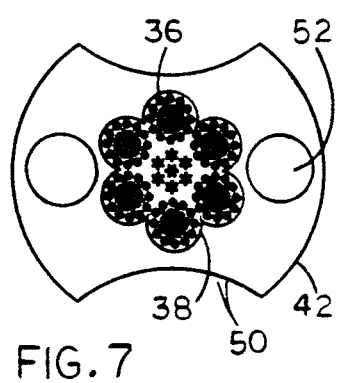

FIG. 7 A 6×25 filler wire Type W wire rope 38 with an IWRC core passes through a disk center hole 38, which disk features two external helical passageways 50, and two internal helical passageways 52.

Figure 8:
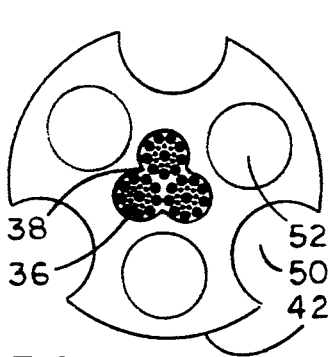

FIG. 8 A 3×19 Seale wire rope 36, passes through helically grooved center hole 38, in disk with edge 42 containing flutes 50 and holes 52.

Figure 9:
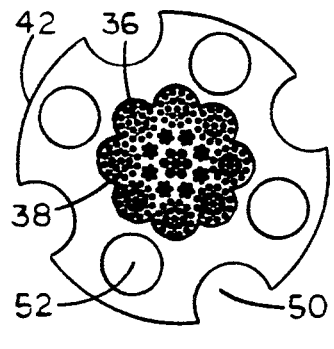

FIG. 9 A disk with edge 42, has a center hole 38 with helical grooves, enclosing an 8-Strand Bethex wire rope 36, and has four external 50, and four internal 52, passageways.

Figure 10:
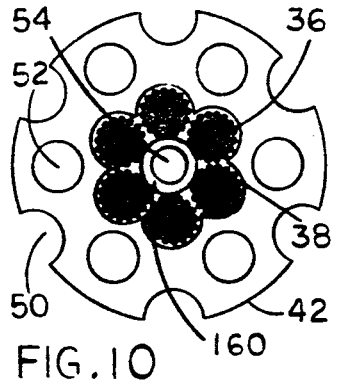

FIG. 10 Disk center hole 38 conforms to a 6×49 filler wire Seale wire rope 36, with the rope core replaced by a high-carbon cold-drawn wire-wound spring 160 with a center passageway 54, and includes passageways 50 and 52.

Figure 11:
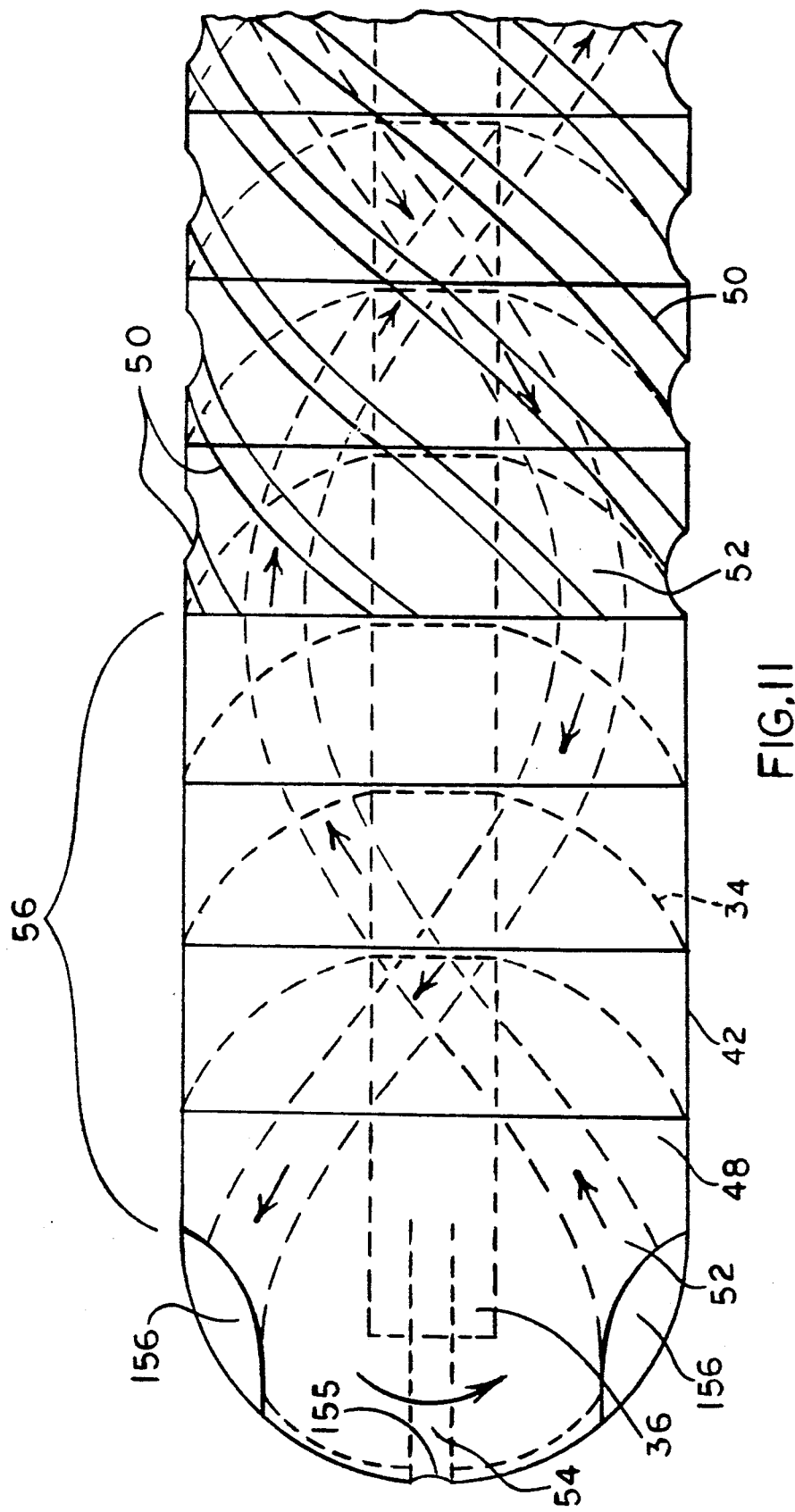
FIG. 11 is the drill bit end of a flexible drillstring.

FIG. 11 A drillstring bit end includes a multiplicity of disks with spherical surfaces 34 and cylindrical edged 42 adjacent to a drill tool bit 48 such as a steel-body bit with stud-type polycrystalline-diamond-cutter (PDC) bits (not shown). The tool bit is attached to the end of a cable, e.g. wire rope 36, and includes a center passageway 54 with outlet 155. Additional helical internal passageways 52, with an inlet/outlet 156 in the tool bit parallel the helix of the wire rope. External helical passageways 50 wind counter to the rope helixes, and begin a few disks back from the tool 48. A length 56 without external passageways is provided to direct return flow through the internal passageway 52 as the length 56 blocks flow to grooves 50 by being sized to the tool diameter, and thus to the drillhole.

Figure 12:
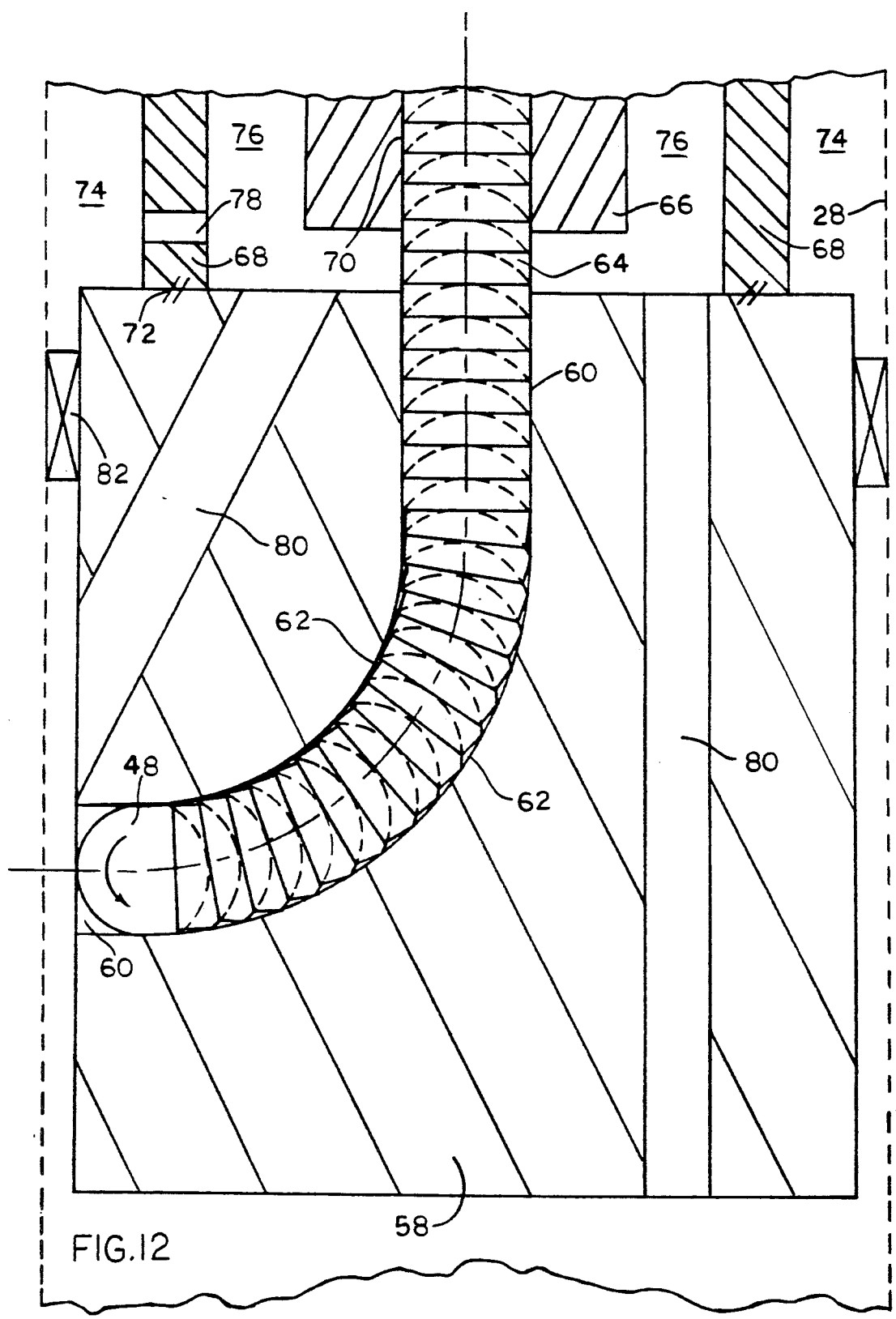
FIG. 12 is a flexible drillstring within a deflection block.

FIG. 12 A one-piece deflection block 58 in a primary wellbore 28, contains a flexible drillstring 64 with drill bit 48 within the passageway 60 sized to the drillstring, and within the passageway 62 sized to the articulated rotating drillstring. A rigid rotary drive tube 66 engages with the drillstring 64, within external grooves in the outer surface of the drillstring at 70, the engagement area of the rotary drive tube to the flexible drillstring, just above the deflection block 58. A non-rotating pipe section 68 is connected to the deflection block at 72.

Fluid communication passageway 78 connects the wellbore annulus 74 to internal fluid passageway 76, when specified. Seal 82 between the deflection block and the wellbore, when specified, controls fluid flow. The fluid passageways 80 through the deflection block 58 are also used for fluid flow management, if needed.

Figure 13:
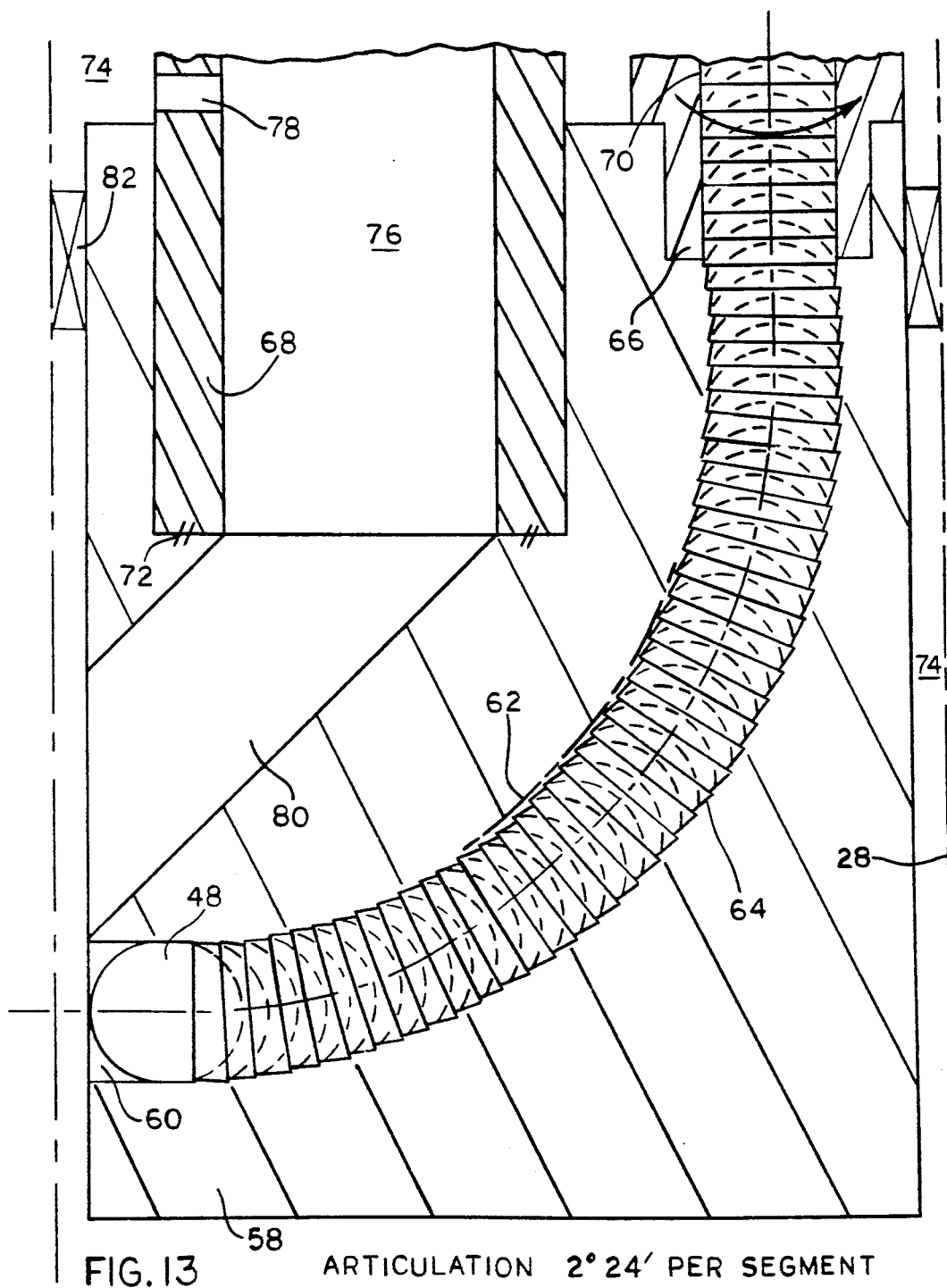
FIG. 13 is a flexible drillstring within a deflection block.

FIG. 13 Off-center drillstring passageway 60 and 62 directs a flexible drillstring 64 through a one piece deflection block 58. Rotary drive tube 66 engaged to the drillstring at 70 in grooves (not shown) allows passage of the drillstring during drilling. Pipe 68 connects at 72 to the deflection block 58 and permits fluid flow through passageways 76 and 80, and through communication port 78 to the annulus 74 whenever required. Seal 82, between wellbore 28 and block 58, controls flow.

Figure 14:
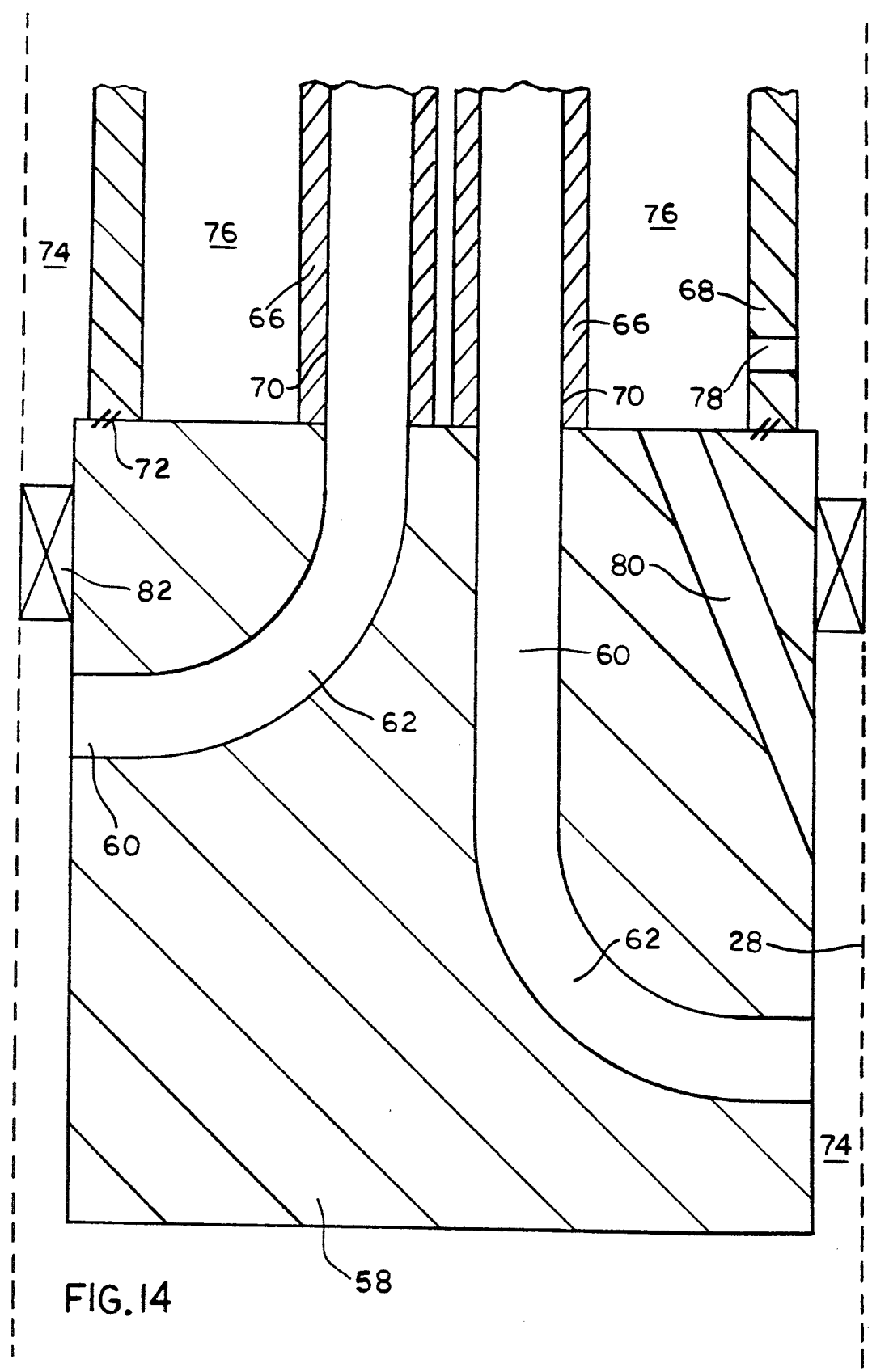
FIG. 14 is a section of a deflection block with multiple passageways.

FIG. 14 The elements of FIGS. 12 and 13 are repeated, except two drive tubes 66 and two passageways 62 permit drilling two drainholes simultaneously.

FIG. 15 A one-piece deflection block 58 is arranged to drill five drainholes at the same time.

Figure 16:
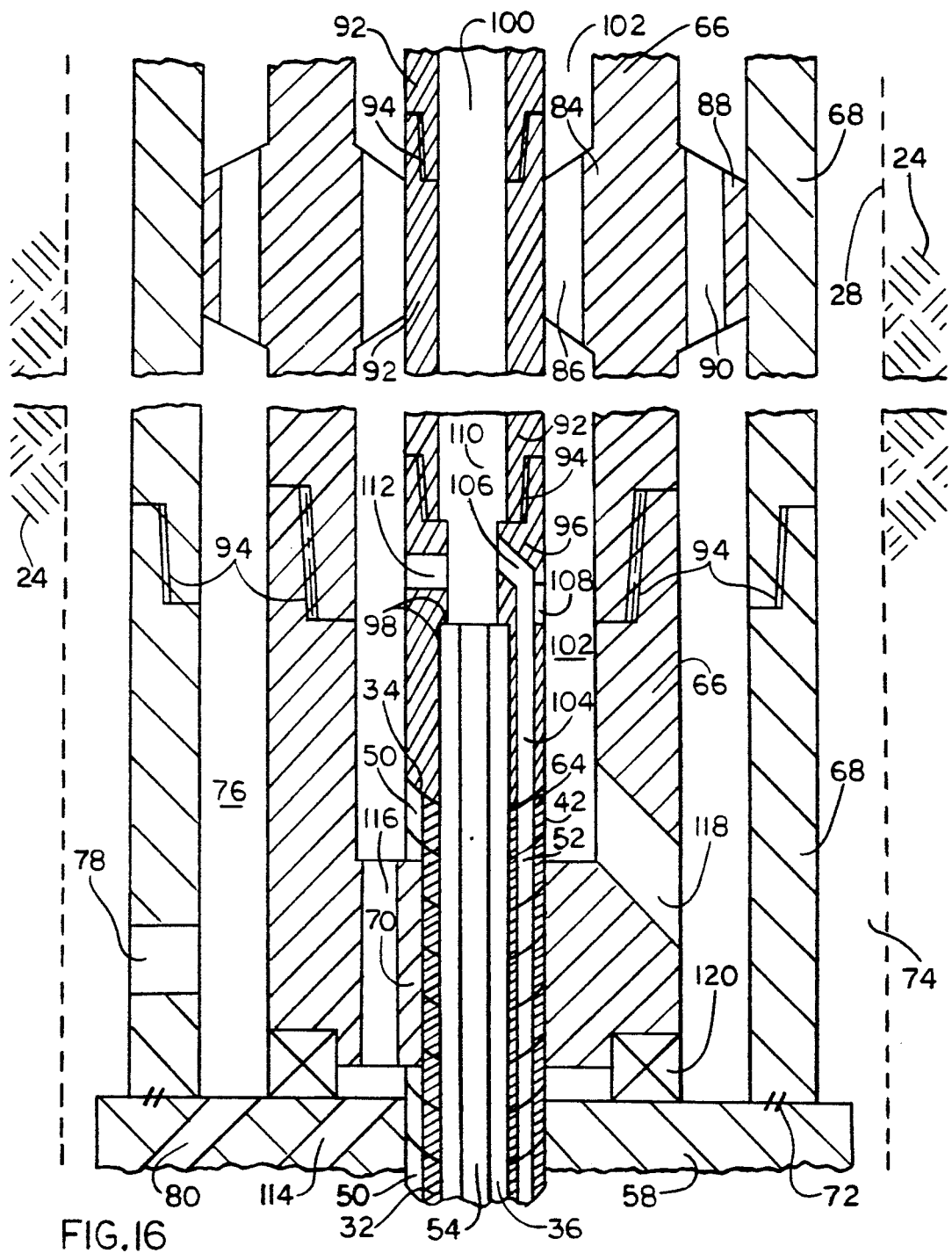
FIG. 16 is a flexible drillstring end engaged to rigid drillstring lengths, and surrounding elements, in cross-section.

FIG. 16 A cross-section of a deflection block 58 and cooperating elements within a primary wellbore 28 in the earth 24. Principal fluid passageways include the wellbore annulus 74, and any of the following that can be utilized: 50, 52, 54, 76, 86, 90, 100, 102, 104, and 110. Communicating fluid passageways that may be used include 78, 80, 106, 108, 112, 114, 116, and 118. A flexible drillstring 64 includes disks 32 with spherical surfaces 34, and a wire rope 36 fastened at 98 to end piece 96. Rigid drillstring sections 92 are connected by a thread connection 94. Also using threaded connections 94 are assembled sections of the rotary drive tube 66, and of the non-rotating pipe 68. The edges of the disks 42 contain groove 50 which engages at 70 to a protrusion into the groove from the drive tube 66. Inner stabilizer 84 and outer stabilizer 88 guide the drillstring 64 and 92 and the drive tube 66 within pipe 68. Rotary seal 120, between the drive tube 66 and the deflection block 58, blocks fluid flow when in place.

FIG. 17 The segments 140 have male/female tongue and groove engagement at cylindrical surfaces 142. The ends mate, with 90° orientation, at concentric cylindrical surfaces 145. A center fluid passageway 144 contains a high-carbon cold-drawn wire-wound spring 160.

FIGS. 17A and 17B These are end views of FIG. 17.

FIG. 18 Segments 141 have female/male tongue and groove engagement at cylindrical surfaces 143. Engagement, with 90° orientation, is at concentric cylindrical surfaces 145. A center fluid passageway is 144.

FIGS. 18A and 18B These are the end views of FIG. 18.

Figure 19:
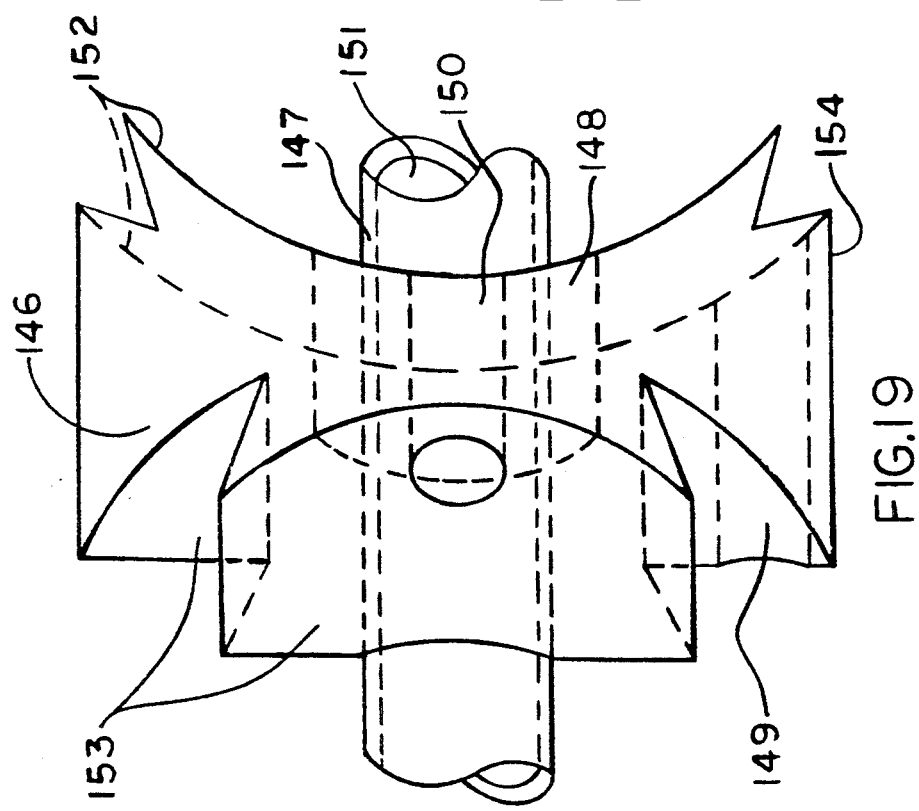
FIG. 19 is an interlocking flexible drillstring segment, with center hose.

FIG. 19 A short segment 146 features a center hose 147 with fluid passageway 151, an external fluid passageway 148, internal fluid passageways 149 and 150, concentric cylindrical surfaces 152 which mate with the male cylindrical tongue and groove surfaces shown here as 153, and a cylindrical outside drillstring surface 154.

Figure 20:
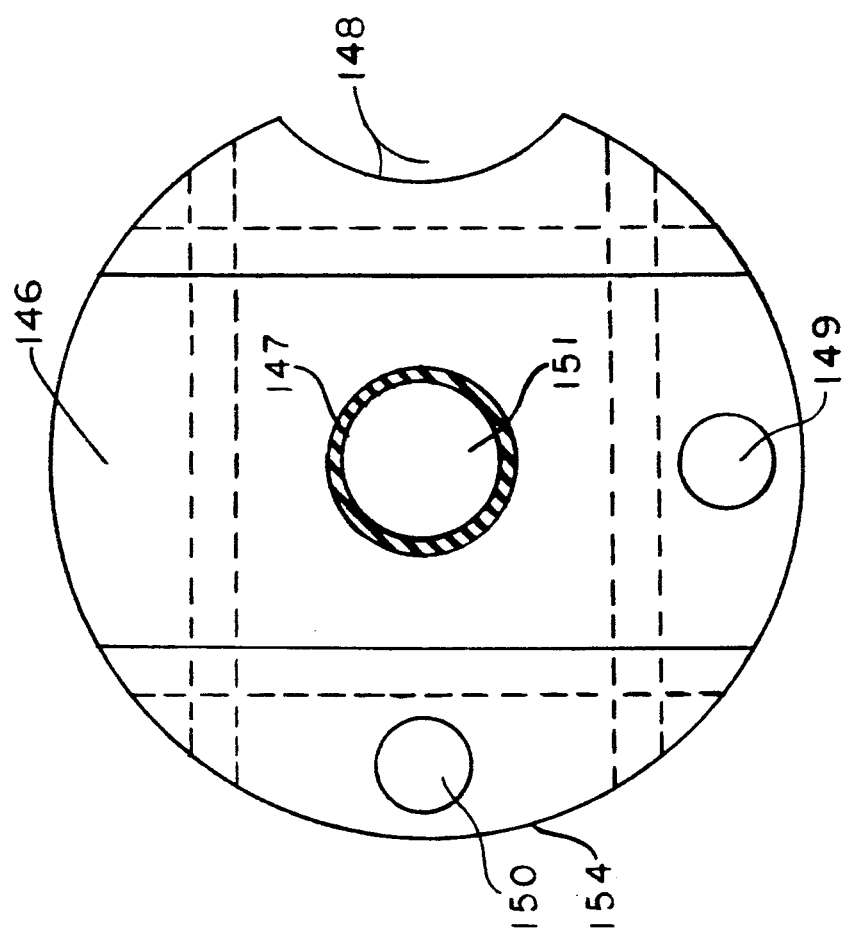
FIG. 20 is another view of FIG. 19.

FIG. 20 An end view of FIG. 19.

Figure 21:
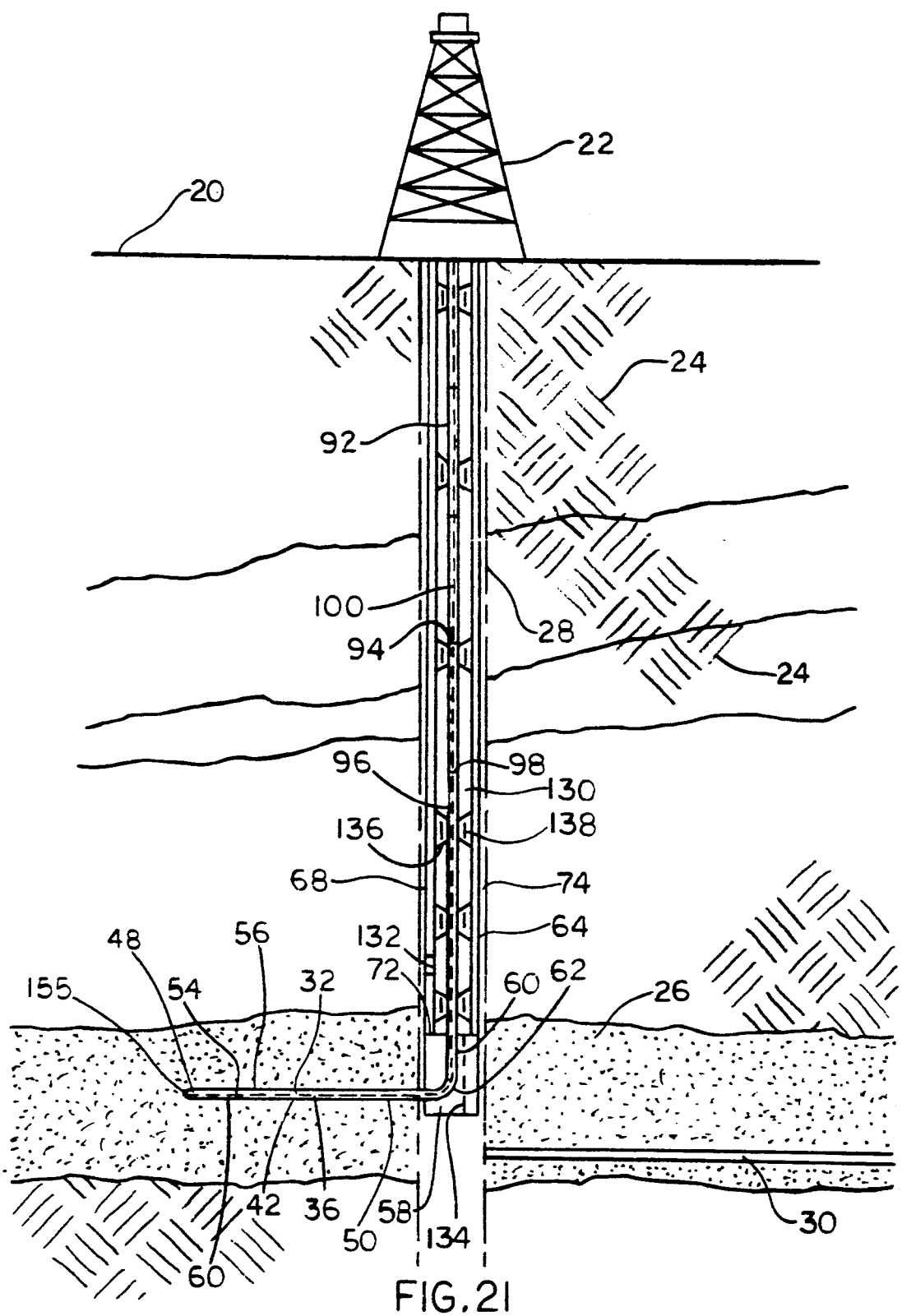
FIG. 21 is an earth section in accordance with the present invention.

FIG. 21 A rotary drilling rig 22 at the earth's surface 20 drills drain holes 30 directly into a hydrocarbon zone 26 from a wellbore 28 as presented in Claim 1 of the present invention.

DETAILED DESCRIPTION OF THE INVENTION

A method and apparatus for drilling lateral drain holes 30 from existing wells 28 comprises a flexible drillstring 64, placed within a primary wellbore, cooperating with a deflection unit 58.

The drillstring has a flexible portion 64, formed from interassembled rigid tubular elements 32 and cable 36, mounted at the lower end of a rigid extension length assembly 92.

The deflection block 58, within the primary wellbore 28, is connected to the lower end of a non rotating pipe assembly 68, the upper end of which is fixed within the wellhead.

Since the flow of oil into a well is dependent on the wellbore surface area presented within a producing zone, as well as to the distance of the oil from a drill hole surface, adding a few lateral drain holes 30 will greatly enhance the well for drain purposes.

This invention permits the lateral drilling of many drain holes 30 from a wellbore 28 in any direction and at any angle from the vertical at specified depth locations within a producing zone.

These drain holes will be completed for several hundred feet, and although they are of small diameter, the exposed area may be multiplied 100 or more times; and, placed proximate the oil.

The drain holes can be maintained in a relatively straight line within the uniform matrix material beds commonly found within producing zones of sands, tight sandstones, shales, siltstones, limestones, chalks, cherts, evaporites, and the like.

The required deviation is accomplished within the wellbore with a very short radius of deflection. By way of example, the radius of the deflection turn can be less than one inch (1") for a 90° deviation with a ⅜" drillstring with ten (10) segments in the turn, each segment being 5/32" thick and each providing a 9° deviation.

The foregoing calculation is based on a drillstring diameter four times that of the segment length. This ratio is arbitrary and will be changed to best work with the conditions existing. More ideally, thirty (30) segments at 3° each will comprise a 90° turn.

In a preferred embodiment, the present invention provides apparatus for lateral drilling comprising a flexible drilling string 64 consisting of a series of short segments 32 wherein each successive segment is operatively interrelated to the next segment by a surface means 34, with the flexible drill string being essentially the length of the lateral bore hole length to be drilled plus a short additional length requirement for the section extending back through the deviation curve block 58, and into the wellbore at its near end, and to the first of a series of mating rigid tube sections 92 that extend to the surface, and having at its far end a special end segment being a drill bit tool 48 of a configuration mating with the flexible drill string 64, the length of the assembly from the drill tool 48 to the mating tube sections 92 having one or more debris grooves 50 and/or internal passageways 52 for cuttings removal leading straight, or helically, from the drill bit to the mating tube section, and then through passageways provided into the wellbore annulus 74.

The drillstring may be either hollow, with one or more internal passageways 52 and 54 to serve as drilling fluid conduits; or solid, relying on fluid or oil within the hydrocarbon zone for drilling lubrication, with one or more cuttings grooves 50 helically conveying the cuttings to the wellbore 28, as with an auger, where they will encounter fluid from another source for their removal from the wellbore 28 to the surface 20.

The drillstring components will be made from quality materials suited for their purpose, including tool steels, spring steels, Level 3 and Level 4 steels, and the like.

In a preferred embodiment, the segments will consist of a series of disks 32 of which the mating surfaces are spherical 34. As scaled in the accompanying drawings the diameter of the spherical surfaces of each side are in a ratio of approximately 10 to 9 to the diameter of the drillstring. Each washer is closely fitted to adjacent washers in any position, whether flexing or not.

One hole through the center of the disks 38 will be sized to be closely fitted to a suitable wire rope 36, or the like, that will pass through the series of disks 32 that, along with the wire rope, are required to make up a drillstring. The hole will have internal helical grooves 38 and 40, or flutes, through the disks conforming to the helix form of the outside of the wire rope 36, or the like, so that the disks will be self-aligning when their spherical surfaces are tightly arranged against adjacent washers. This self-aligning ability of the disks will provide the necessary alignment for external grooves, or flutes, and/or internal passageways that may be used. The internal passageways can be generated and spaced so that they will form helical holes parallel to the helix of the wire rope strands, straight, or of a helix counter to the wire rope strand helix. The external grooves can be positioned such that, when aligned with adjacent disks, the groove that they will jointly form will be a counter helical path, with its helix in an opposite direction to the wire rope strand helices. This external passageway will provide an augering action to enhance movement of the cuttings and fluids toward the wellbore, and the rotation of the drillstring will be such as to wind tighter the wire rope helix, rather than to unwind it.

In this embodiment, the drillstring will consist of a wire rope 36 with a bit 48 formed onto one end, and a connective piece 96 formed onto the other end such that it may be connected directly at the second end to a mating vertical drill tube section 92. Between the two end pieces that are attached to the wire rope ends 98 and 158, will be aligned the plurality of spherical surface disks closely fitted one to the next. In this arrangement, it can be advantageous to prestress the wire rope by putting a tensile force along the rope during assembly. This force will tend to make the drillstring straight under unloaded or lightly side-loaded conditions. The rotation of the drillstring during operation, in the direction that will tighten up or shorten the wire rope, will enhance the preload condition and its straightening effect, while assuring a tight seal between the disks limiting fluid leakage from the passageways.

The spherical surfaces of the disks will be coated with wear resistant and/or lubricating type coatings such as a low friction PTFE coating material.

The helical passageways 38 through the disks 32 will be relieved slightly at one face 44 or at both faces 44 and 46 to permit the drillstring to deflect, such as within the deflection block 58, without crushing the surface of the wire rope 36 at the faces 34 of the disks while they are passing through and rotating within the deflection curve 62. This relief will be limited to the requirement of each disk as it is related to its share of the total deflection. The relief will be such as to permit no more than the desired deflection, while containing the strain within the wire rope, without damage to the drillstring, which strain will react to straighten the drillstring when the external side thrust forces are reduced or removed, thus permitting and encouraging the drilling of a straight drillhole upon exiting of the bit and drillstring from the deflection block.

Over short distances, the influence of gravity will have no noticeable effect on the horizontal drillstring. Over longer distances, the drillstring 64 will be piloted by its drillhole 30, to which it will be closely fitted, assuring a very practical method for drilling essentially straight holes within relatively uniform formations.

The disks 32 will effectively contain the wire rope 36 within their closely fitted internal helical grooved passageway 38 to cause the drillstring assembly to react rotationally much like a solid shaft member, thus capable of effectively transmitting the torque required for drilling the drain holes 30.

In uniform matrix formations, the drillhole will proceed in a straight line as a result of the bore the drill has completed, the alignment centering forces within the wire rope, re-alignment from the rotation of the drillstring, and the static friction between disks.

Another embodiment provides for drillstring components not requiring a wire rope, or the like; but instead, using segments 140 with cylindrical mating surfaces 142 and 145 in place of spherical surfaces, which cylindrical surfaces are interconnected by tongue and groove type means with parallel surfaces between segment engagement surfaces, and having alternate 90° interconnections provided at each face of each segment, with one face providing male tongue and groove surfaces 142, and the other face providing female surfaces 145, aligned 90° from the first.

In this arrangement, the torque transmission of the drillstring will be through the segments 140, one to the next.

The surfaces of the segments can be accurately formed so that leakage between segments will be almost eliminated over the length of the drillstring. This will be advantageous where a fluid passageway is provided, and especially when several internal fluid holes are required. In this form, no deflection limitation or restorative forces are present.

To correct the above situation, a center hole 144 or 151 for fluid passage will be formed, and fitted with a suitable hose type member 147 which, under pressure, will tend to both restrict the amount of deflection between adjoining segments, and to return the drillstring to a straight alignment whenever side thrust forces are sufficiently low; while, at the same time, preventing high pressure leakage.

It is an object of this means to provide drilling fluid at high pressure, and even at extremely high pressure, to cause the drill-string to remain straight under moderate side load conditions, and to assure a fluid supply of volume and pressure sufficient to achieve maximum drilling circumstances.

The hose 147 will provide sufficient flexibility to give the drillstring its required flexibility without any relief at the segment face edges within the center hole 144. The hose will then react against the total hole surface through each segment to provide a strong straightening effect. This can be likened to a long small diameter balloon which remains essentially straight resisting the forces of deflection effectively even though it is only a few thousandths of an inch thick, and is expanded by air, at a very low pressure.

Restorative forces can also be provided by the addition of a closely fitted high-carbon cold-drawn wire-wound spring 160 placed down the center 144 of the assembled segments 140. This spring may be used in conjunction with, or separately from, a center hose 147; which hose if used, would then be placed within the spring 160.

Other passageways through the segments can handle the fluids and the cuttings effectively without seals at lower pressures.

The deflection block 58 will be positioned within the primary wellbore 28 at the depth, and at the heading desired for the lateral development of each drain hole 30. This block will be supported from the surface of the earth by an assembly of rigid non-rotating pipe sections 68, thus making possible accurate determination of its location.

The deflection block will have an exit angle to the wellbore wall as desired, including plus or minus from the 90° angle development as shown on the accompanying drawings. This exit angle will be custom formed into the deflection block.

The deflection block will be formed in one piece.

The deflection block will be made from strong wear and abrasion resistant materials such as steels, ceramics, carbides, and the like.

The block will permit the passage of the articulated drillstring 64 through the deviation curve 62 in a passageway sized to closely conform to the deviated drillstring as it proceeds while rotating through the curved portion of the passageway.

The block will include straight entrance 60 and exit 60 lengths sized accurately to the straightened drillstring diameter.

The internal surface of the deflection block passageway will act as a bearing surface during the deviation of the drillstring while drilling, and will be prepared, treated, and coated accordingly.

Directly above the deflection block 58, inside the non-rotating pipe 68, and surrounding the drillstring assembly 64, will be a rigid rotating tube 66, assembled from sections, engaged with and providing rotation to the drillstring at 70. This rotating tube assembly will not move vertically during drilling. It will receive its rotary drive from a rotary drilling rig 22 at the surface.

The rotating drive tube will have a section at its lower end 70 in engagement with the drillstring; e.g. into the external grooves of the drillstring, for the purpose of providing rotary drive to the drillstring just prior to its entering into the deflection block. Where this is sufficient, no other rotary drive engagement with the drillstring will be provided. However, additional engaging points, above this location, can be provided, especially at the joints between the rotating tube sections. The drillstring may also be rotationally driven at the top end along with the drive tube. The rotating tube will thus contain the flexible drillstring above the deflection block.

In a preferred embodiment, the drillstring will be provided with only vertical forces as operations proceed. Forces downward to augment existing forces, or upward to reduce downhole forces, can be accomplished, at the drilling rig at the surface, by usual means, including the use of double-acting hydraulic cylinders interacting with the string through clamps and bearing collars.

Another embodiment will provide for several lateral holes being drilled radially from the wellbore simultaneously; either all at the same depth, or at different depths. This is made possible, by the present invention, in existing wellbores because of the very short radii requirement to build workable deviation angles. A planetary or similar multiple spindle gear box held stationary and driven by a single rotating drive, splits the rotational drive into two or more output shafts, each providing central passage to two or more cooperating rigid drive tube assemblies, each housing a drillstring constructed as previously detailed, and interconnected with the drillstring just above and adjacent to the deflection block. Each string will receive its separate vertical thrust forces.

This multiplicity of strings will pass through a deflection block containing a similar number of passageways with selected exit headings.

A preferred embodiment, under many conditions, especially for shallow wells, will be to drive a drillstring from the surface, inside a non-rotating pipe. This pipe will hold the deflection block in position, provide a fluid passageway between the drillstring and the pipe, and provide integral stabilizers as required by the drillstring. The drillstring will receive both rotational and vertical force control within the wellhead by conventional rotary drilling rig methods. The string will be as already depicted, and as drawn in FIG. 21.

Another embodiment requires no outer non-rotating pipe. This embodiment has the rotating tube which will transmit rotational forces to the drillstring, also acting as the suspension support for the deflection block, with a rotary joint interface between the end of the rotating tube, and the top of the block. The block will be placed to the desired depth and heading by the tube, which will not thereafter move vertically as drilling begins. A series of spring, or fluid pressure, actuated antirotation pins, built into the block, will engage the wellbore wall directly, to oppose the rotational forces, and thus hold the block stationary. Removal of the fluid pressure, and/or the use of counter-rotational drive to the block, will permit its being raised, or lowered, within the wellbore.

In a preferred embodiment, the wire rope cable, or the like, will be enclosed within a polymer resin system matrix, including selected passageways and features; such matrix being extruded over and/or molded around the cable, and consisting of resins and compounds, plus fibers such as aramid, carbon, glass, graphite, and the like, used singly, or in combination, and also including the use of coupling agents, including aluminates, silanes, titanates, zircoaluminates, zirconates, and the like, which, when combined, result in a very strong and flexible hybrid matrix capable of cooperative properties with the cable, the whole becoming a usable continuous drillstring, enabled to provide the required deflection, rigidity, thrust, and torque to cooperate with the elements already, or to be, detailed to perform in conjunction with a flexible string.

The drill bit, of materials such as carbides, ceramics, diamonds, and the like, will provide one or more nozzles for drilling fluids. Fluids can also be fed separately into the wellbore for cuttings removal up the wellbore. Fluids can include air, water, oil, mud, and combinations, as an aeration or emulsion, and the like. Supply routes include one or more passageways within the drillstring, between the string and the rotating tube assembly that drives the string, between the tube assembly and the fixed pipe assembly, and/or down the wellbore annulus.

For cuttings and fluid return to the surface, external grooves and/or internal passageways in the string will return cuttings from the laterals to the wellbore. The cuttings will then be ascended to the surface through the well annulus; or, between the pipe and the tube.

An embodiment will have cuttings from external grooves in the string pass through passageways outside the deflection block into the annulus, then to the surface, with fluid added between the pipe and the tube, through passageways provided above the block, and/or through the block, to augment the fluid flow.

At opposite ends of the flexible cable, e.g. wire rope, are attached, a drill bit, and a drillstring connection end piece.

These are attached to the cable by any suitable means, permanent or temporary, including being formed or fused on, as with powdered metal assembly, or by being soldered, sintered, brazed, welded, injection-metal assembled, and the like; or by, but not limited to threading, swaging, clamping, crimping, or with dowels, pins, retaining rings, or with adhesives.

A wire rope, and the like, of one or more strands of wires, or fibers, is an elastic member, which flexes under load. This flexibility is derived from three sources, constructional, elastic, and rotation on its axis.

A wire rope can be selected to conform closely to many requirements.

Along with elasticity, which includes the trait of returning from deformation, to an original position or shape, when the forces causing deformation are reduced, or eliminated, a wire also provides tensile properties, rigidity, stiffness, torque capacity, and to some extent, thrust. All of these properties can be can be enhanced when properly contained, and augmented, by other elements of the design.

Thrust also comes from the containment elements which are selected to surround, and cooperate with, the wire rope; this especially from materials with a high modulus of elasticity, as characteristic of many composites.

Maximum flexibility in a wire rope comes from the use of a large number of small wires, using Lang lay in the design of the strands, and the preforming of both the wires and the strands to their finished rope position.

The resistance to distortion, by a wire rope, may be very effectively increased by using, in place of the center core, a high-carbon cold-drawn wound spring, which spring will also add to the thrust capacity.

A wire rope can be effectively looped to encircle a radius curve less than four (4) times its diameter. Composite materials, with a center of wire rope, can now provide the necessary features as well as the characteristic properties required.

The present invention will embrace an extruded one piece composite flexible drillstring, with necessary fibers and/or wires, and of preferred characteristics and features.

The drillstring is closely sized to the drillbore hole diameter to facilitate straighter drain hole development, with the hole acting to pilot the drillstring. External grooves are important to assist in clearing the drillhole of cuttings, and thus to prevent binding of the string.

Internal return passageways are important to keep fluid and cuttings flow rates high. Total open passageway area is important to provide greater flow rates and/or less pressure drop. High pressure capability can be very important. A drillstring, of high efficiency, results from the appropriate use of the available drillhole area.

Internal passageways can be formed to be straight, or as a helix following the lay of the rope strands, or opposed; while externally the grooves are in an opposite inclination to move fluids and cuttings toward the wellbore. These external grooves may be designed to track from one to the next by random placement of the disks, by selective placement, or by having disks of two or more types, which placed in sets of two or more selectively, continue the desired passageways from set to set for the total length of the flexible drillstring.

Another arrangement provides no defined external passageway, but instead, has plow like raised areas on the disk edges; which, both move the cuttings along to the next disk, and support and center the drillstring within the drain hole.

In all embodiments, it is an object to have the drillbore provide support and guidance to the drillstring, with a minimum of cutting in the bore hole from the grooves, thus groove edges, or the like, will be designed as non-cutting edges with as much support being provided as practical.

The flow of liquids in wellbores is generally limited to 3 to 5 feet per second, with maximum rates to 6 to 10 feet per second, so as to not jeopardize the stability of the walls of the bore. The velocity of ascend in an annulus should be beyond critical laminar flow, which is generally 3 to 5 fps, to facilitate cuttings removal. These velocities do not automatically coincide with the flow volumes desired to properly irrigate the drill bit, or to transport the cuttings.

Efficient drillstring design depends on efficient use of the areas available. Flow velocities within pipes can generally be 5 to 20 times the flow in an uncased annulus or bore. A flow at 6 fps yields 18.7 gpm/sq. in. while flow in pipes, or the like, can be 150 gpm/sq. in., or 8 times as fast; thus, internal flow in the drillstring becomes an important consideration.

In a preferred embodiment, two fluid passageways will provide fluid supply; the first for drilling fluid to the tool bit, the second for fluid for use within the primary wellbore to augment the first in bringing the cuttings to the surface.

The first fluid can be at its required flow and pressure, even of very high pressure to provide jetting action through orifices at the tool bit. Where high flow rates are required, this first fluid can be returned, from the drill end to the primary wellbore, by internal passageways; otherwise, external grooves can be sufficient.

The total volume of the fluid and cuttings will be returned to the surface within the primary wellbore annulus if it is suitably cased, or if flow volumes are low enough for the available areas.

To balance the fluid supply systems to the preferred area distributions, the second fluid can be supplied down the annulus, and returned to the surface inside of the non-rotating pipe along with the first fluid.

The drawings show that fluid communication holes and passageways are readily provided to permit the chosen fluid passageways.

Included as an object of the present invention is an improved flexible drillstring section of unique configuration combining optimal flow characteristics with increased rotational strength and tensile capability, with improved flexing while retaining the integrity of the components, and improved bearing characteristics between elements, to effectively and efficiently transmit power, while reducing wear, and thus to improve the operational life and efficiency, as well as use and cost efficiency, of drain hole drilling apparatus, and means.

Lateral drilling is a completion technique that increases contact with producing formations. Lateral holes, being drilled radially from the primary wellbore, are usually horizontal in order to increase contact with the pay formation, and thus to increase primary production; and to maximize production of low permeability, and low pressure formations, and low energy reservoirs.

Multiple lateral holes can be drilled from a single wellbore into a producing zone, also allowing the completion of more than one formation.

Inclination from the vertical within the deflection curve can be 90°, as with horizontal drain holes; or less, such as from 20° to 90° for dipping formations; or more, such as to 160° for steeply pitched deposits.

The heading direction can be placed within ±1°, at its start, with careful alignment of the sections.

The elevation accuracy of the drain hole entrance, as from care in the primary wellbore measurements, the pipe assembly measurements, the suspended pipe length calculation, and placement, can be within 1 foot of target.

The foregoing disclosure of the present invention further comprises the circumstances of, and the means for, using a flexible drillstring with a diameter limited to about 3", and being preferably smaller, even down to under ¼" for short drain holes, or where more length in the deflection block curve is required for high deflection angles. The deflection, which is uniform within the deflection curve, will be limited to between 1° and 10° for each disk, or segment. Distances drilled will be from a few feet to more than a thousand feet dependent of the formation conditions, planned distance, number of holes drilled at one time, number of formations being completed, and other cost factors. The aligned length of the spherical surfaced disks will be less than the drillstring diameter for most uses, but can be at times 1/9 or less. The drillstring will be, most often, down the center of the primary wellbore, but will also be off to one side placed adjacent the wellbore wall for use of a larger deflection curve radius, in which case the non-rotating pipe can be to the opposite wall, rather than to contain the drillstring and the rotary drive tube. The completion of very thin pay zones, from 10 feet to less than 1 foot, such as when a primary wellbore is into a pinchout of a lenticular sand body, will be by drilling within the formation from the periphery of the lens toward the center of the formation.

Furthermore, the rigid drive tube stabilizes the drillstring with its internal integral stabilizers when it is used. And, it receives its stabilization from the outer non-rotating pipe with either the tube, or the pipe, having the integral stabilizers that are between them. The drillstring, and the drive tube, will be driven separately at the earth's surface. The connection between the drive tube and the drillstring can be accomplished adjacent to, and just above, the deflection block by one or more protrusions from the drive tube engaging into one or more grooves within the outer surface of the flexible drillstring. This will be of particular importance wherein the well depth is relatively great compared to the drillstring diameter and/or length, e.g. length of the drain hole to be drilled; since a long thin drillstring, from the deflection block to the surface, will not have to be subject to the total drilling torque for this major length. This, of course, is the virtue of the rigid rotary drive tube.

Likewise, the flexible drillstring, with its somewhat shorter inner flexible tensile member and with its end pieces, can be, of length, to the precise needs of the drain hole development.

Additionally, the outer non-rotating pipe, being suspended at the earth's surface, can be lowered to the formation simultaneously with the rotary drive tube, either separately, or in mutual suspension Only the drillstring will be provided with vertical movement during drilling.

Also, the one or more fluid flows into the well from the earth's surface and the returning flow back to the surface, for drilling and cuttings transport purposes, can be within the fluid passageways provided; as within the primary wellbore, within the wellbore annulus, between the non-rotating pipe and the drive tube, between the drive tube and the drillstring, down the drillstring center, and through the disks surrounding the drillstring center cable, and; as within the drain hole, within the external grooves of the flexible drill-string, through the disks surrounding the drillstring center cable, and down the drillstring center and its exit orifices. Also provided for are communicating fluid passageways between adjacent flow paths to permit desired flow path interconnections for cooperatively distributing, directing and managing the fluids flow within the well.

Moreover, when the tongue and groove segments, with their interconnecting concentric cylindrical mating surfaces, can be shortened to an aligned length of less than $\frac{1}{2}$ of their diameter, or as depicted if FIG. 19 to $\frac{3}{8}$, and can readily include mating tongue and groove connections with a drill bit at one end, and a connection end piece at the other, wherein the diameter of the mating surfaces is somewhat larger than the diameter of the drillstring; resulting in a drillstring which can be used in conjunction with the system elements, and means, comprised as hereinbefore depicted within the description and the drawings of this disclosure; as, an alternate flexible drillstring to the flexible drillstring which consists primarily of a cable, and of the spherical surfaced disks Similarly, the flexible drillstrings comprised of a hybrid matrix of resins, compounds, coupling agents, and fibers can be used in conjunction with the disclosure as alternative flexible drillstrings. These drillstrings, by means for, are formed and/or extruded to a one-piece composite, to which a mating bit and a connection end piece will be attached, which includes features and passageways, and including fibers such as aramid, carbon, glass, graphite, and metal; and, coupling agents such as aluminates, silanes, titanates, zircoaluminates, and zirconates. One form of this drillstring has a fiber cable positioned centrally, and enclosed within a polymer resin system matrix; while another form, comprises preformed and/or preshaped, positioned, layered, stranded, twisted, and/or woven fibers selectively positioned within a polymer resin system matrix.

Known apparatus and method components comprise many of the elements herein described and/or depicted; while, others are disclosed in source literature such as the Composite Catalog of Oilfield Equipment and Services published by World Oil.

It is manifest that many variations and modifications are possible within the spirit and scope of this disclosure. Therefore, the invention is not limited to the exemplification set forth herein, but is to be measured by the scope of the claims, and including all equivalents to which each element thereof is entitled. The embodiments of the invention in which an exclusive property or privilege is claimed follow.

What is claimed is:

1. Apparatus for drilling a drain hole horizontally from an existing wellbore comprising:
   a flexible rotary drillstring, with
   a central flexible tensile member, and
   a plurality of external disks, with mating spherical surfaces, each with a central hole closely fitted to the central member, arranged sequentially along the length of the central member, and
   wherein the disks are slideably tight, one to the next.

2. The drillstring of claim 1 further comprising;
   a central flexible tensile member of length approximate that of the flexible drillstring, and
   wherein the disks are contained, slideably tight, along the central member, between a drill bit, and connective piece, and
   wherein the assembled disks contain the central member, and are rotationally engaged to the central member, and
   wherein there is deflection, continuously, at each disk mating surface, within a deflection curve, and
   wherein the diameter of the spherical surfaces is greater than the diameter of the drillstring, and
   wherein the drillstring has an external groove, within the length of its assembled outer surface.

3. The drillstring of claim 2, further comprising;
   a central flexible tensile member comprised of a multiplicity of high strength elastic fibers, and
   a flexible drillstring of length like that of the drain hole to be drilled, and
   a drillstring with a central through fluid passageway, and
   a drillstring, and its bit, being of like diameter, and disks with a low-friction coating, and
   wherein there is relief into the disks, within their central hole at a first spherical surface, to permit flexing, and
   wherein the external groove is helical.

4. The drillstring of claim 3 further comprising:
   wherein the elastic fibers are wound into strands, which are wound into a helical cable, having the noncircular cross sectional shape of a rope, and
   wherein the cable is subject to stress at deflection, and wherein there is a second, noncentral, passageway through the assembled disks, and
   wherein the length of a disk is less than its diameter, and
   wherein the coating is a PTFE contained coating, and
   wherein there is relief into the disks, within their central hole at both a first, and a second, spherical surface, and
   wherein there are more than one external helical grooves.

5. The drillstring of claim 4 further comprising:
   wherein the central hole through each disk is noncircular, and helical, closely fitted to the helix of the cable surface, and
   wherein the strand fibers are twisted in Lang lay, and
   wherein the helically wound cable is rotated in a direction that will shorten, and make tighter, the cable, and
   wherein the central passageway contains a wound wire spring, and wherein there is a plurality of noncentral passageways through the assembled disks, and wherein the length of a disk is less than ½ its diameter, and wherein the relief limits the deflection, controlling the fiber stress to within the elastic properties range of the fibers.

6. The drillstring of claim 5 further comprising:

wherein features, through the assembled disks, and along their collective outer edge surface, receive alignment, one to the next, from the central helically wound cable, and wherein the helically wound cable is a wire rope, and wherein the wire rope is preformed, and wherein the flexible drill string is pretensioned, and wherein the assembled disks provide a solid collar area, adjacent to the drill bit, and of the bit diameter, and wherein the length of a disk is less than 1/5 of its diameter.

7. A drill bit of claim 1 comprising:

a central fluid passageway, and an internal return passageway, and wherein a drill bit collar prevents external passage.

8. The apparatus of claim 1 further comprising:

a deflection block within the existing wellbore, and a flexible drillstring, closely fitted through the block, deflected essentially from vertical to horizontal, and a suspension pipe locating the block within the wellbore, and a rotary drive tube, engaged, adjacent to the deflection block, to the drillstring, within the existing wellbore.

9. Deflection block apparatus comprising:

a deflection block sized to an existing wellbore, and an entrance at its upper surface, and an exit, from its side, directed to the wellbore wall, and a curved passageway, from its entrance to its exit, allowing passage of a rotating flexible drillstring, and wherein the entrance and exit passageways are each essentially of the same diameter as the drillstring, and wherein the curved passageway is essentially of the same diameter as the deflected rotating flexible drillstring, said curved passageway with a radius, for a deflection of 90°, of less than the wellbore diameter, and a second passageway, through the block, from an upper surface, to a lower surface below the drillstring passageway exit, and wherein the second passageway enters from within a rigid nonrotating pipe attached to the upper surface.

10. The deflection block of claim 9 further comprising;

a curved passageway with a radius, for a deflection of 90°, of no more than the wellbore radius, and wherein the deflection is between 20° and 160°, and wherein the passageway has a low-friction coating, and wherein the drillstring entrance is centered into the upper surface of the deflection block, and wherein the block is sized, as closely as operative, to the existing wellbore, and a block with means to engage to a wellbore wall, and a seal between the block and the wellbore wall, and a block of one piece.

11. The apparatus of claim 9 further comprising:

a rigid nonrotating pipe attached to, and suspending, the deflection block, fixing its elevation and direction, and wherein the drillstring is within the pipe, and wherein the pipe stabilizes the drillstring, and wherein the pipe provides an internal fluid passageway, between the pipe and the drillstring, which interconnects with the said second passageway through the deflection block.

12. The apparatus of claim 11 further comprising:

a rigid rotary drive tube contained within the cooperating said nonrotating pipe, and wherein the drive tube contains the drillstring, and wherein the pipe stabilizes the drive tube, by means of a plurality of stabilizers, and wherein the drive tube stabilizes the drillstring, and wherein a stabilizer has a fluid passageway, and wherein the drive tube is engaged with the drillstring, within the wellbore, near its lower end, and wherein there is a rotary fluid seal between the lower end of the drive tube and the deflection block, and wherein the drive tube does not move vertically when drilling.

13. The rotary drive of claim 12 further comprising:

a rotary drive tube engaged to a flexible drillstring, at the entrance of a deflection block, by means of an engagement projection from the drive tube into an external grooved passageway within the surface of the drillstring.

14. The apparatus of claim 12 further comprising:

a deflection block which, by means of communicating fluid passageways, directs the fluid flows within a well, including within the wellbore annulus, and between the nonrotating pipe and the drive tube, and between the drive tube and the drillstring, and within the drillstring, and within the horizontal drain hole, and wherein a deflection block drillstring exit positions the drain hole entrance, heading, and inclination, and wherein a plurality of drillstrings simultaneously develops a plurality of drain holes, from a deflection block, and wherein the elevation accuracy is within 1 foot.

15. A flexible rotary drillstring comprising:

a plurality of elements that are slideably tight at their arcuate mating surfaces, and wherein the elements have concentric, cylindrical, tongue and groove, mating surfaces, and wherein the elements are longitudinally interconnected, and wherein the elements are rotationally engaged, and wherein there is a central fluid passageway, and wherein there is an external passageway.

16. The drillstring of claim 15 further comprising:

a first face, of the said elements, with male tongue and groove surfaces; and, a second face, aligned 90° from the first, with female tongue and groove surfaces, and wherein the diameter of the said concentric surfaces is greater than the drillstring diameter, and wherein the interconnected length of an element is less than its diameter, and wherein the central passageway contains a hose, and wherein there is a noncentral internal passageway, and wherein the external passageway is a helical groove within the outer surface of the assembled elements.

17. The drillstring of claim 16 further comprising:

wherein the central hose conveys high pressure fluid, and wherein there are more than one noncentral passageways, and wherein there are more than one external passageways, and wherein the interconnected length of an element is less than ½ of its diameter, and wherein the elements have a low-friction coating, and wherein the elements are cooperating between a first end drill bit, and a second end connective piece, and wherein the drillstring, and its bit, are of like diameter.

18. The drillstring of claim 17 further comprising:

wherein the central passageway contains a wire spring, and wherein the coating is a PTFE contained coating, and wherein the assembled elements provide an ungrooved land area, near the drill bit, and of the bit diameter, and wherein the assembled elements provide a drill shaft with compressive, tensile, and torsional integrity.

* * * * *